United States Patent Office 2,795,559
Patented June 11, 1957

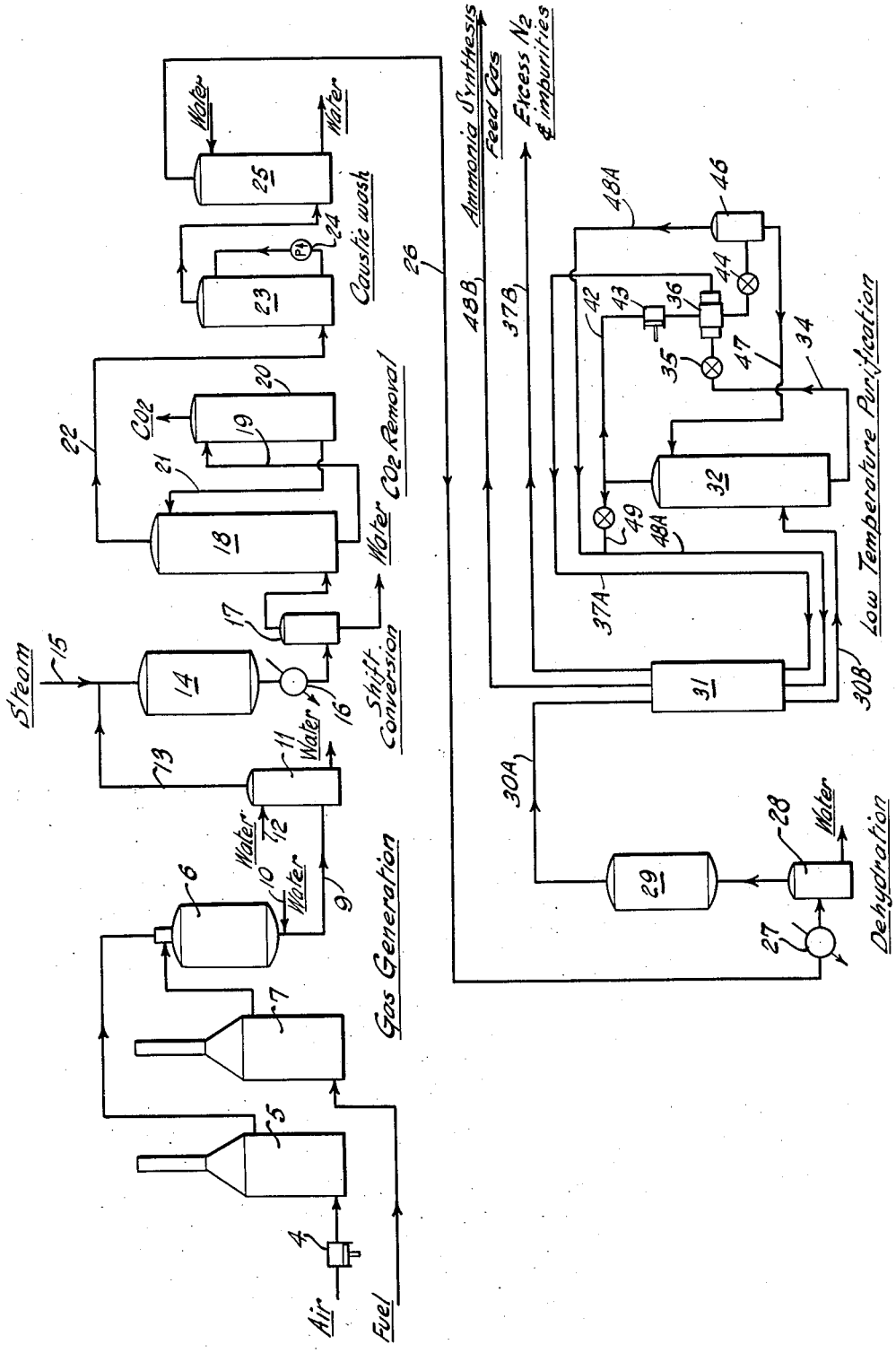

2,795,559
PRODUCTION OF HYDROGEN-NITROGEN MIXTURES

Thomas H. Whaley, Mount Vernon, N. Y., assignor to The Texas Company, New York, N. Y., a corporation of Delaware Application April 1, 1954, Serial No. 420,411

7 Claims. (Cl. 252—374)

This invention relates to a process for the production of a mixture of hydrogen and nitrogen in predetermined proportions. In one of its more specific aspects, this invention relates to an improved process for the production of a mixture of hydrogen and nitrogen containing three parts hydrogen by volume per part of nitrogen.

Various methods have been devised for the production of hydrogen and for blending hydrogen with nitrogen in the required proportions for the synthesis of ammonia. In the synthesis of ammonia, three volumes of hydrogen are required per volume of nitrogen. Carbonaceous fuels including coke, coal, oil, and gaseous hydrocarbons may be utilized for the production of hydrogen. The carbonaceous fuel may, for example, be subjected to partial oxidation by reaction with a suitable oxygen-containing reactant, e. g., oxygen, steam, carbon dioxide, or a readily reducible metal oxide, to produce carbon monoxide, often accompanied by the simultaneous production of hydrogen. The carbon monoxide may then be reacted with steam in the so-called water gas shift conversion reaction to produce carbon dioxide and hydrogen; one volume of hydrogen is produced for each volume of carbon monoxide reacted. Carbon monoxide is mol for mol, or volume for volume, the equivalent of hydrogen in this process since every mol of carbon monoxide converted to carbon dioxide in the water gas shift reaction results in the production of a mol of hydrogen.

The present invention involves the generation of raw synthesis gas, i. e., carbon monoxide or a mixture of carbon monoxide and hydrogen, from a carbonaceous fuel by reaction of the fuel with an oxygen-containing gas in which free oxygen is supplied by air. Oxygen in combined form may also be used for reaction with the carbonaceous fuel. Steam and carbon dioxide are examples of suitable reactants which may be used in conjunction with the air to supply part of the oxygen for the reaction. The reaction of fuel with air is an exothermic reaction, while the reaction with steam or carbon dioxide is endothermic. By balancing the supply of air and endothermic reactant, the desired reaction temperature is autogenously maintained. In general, when the fuel consists essentially of methane, it is desirable to use little or no endothermic reactant. With heavier hydrocarbons, increased amounts of endothermic reactant may be used. Substantial amounts of endothermic reactant may be used in the production of synthesis gas from solid fuels, e. g., coal or coke.

With oxidizing gas mixtures in which air supplies all of the free oxygen directly, a large amount of nitrogen appears in the product gas from the synthesis gas generator. In the process of this invention, the excess nitrogen is removed, together with other impurities in the gas stream, to produce a very pure mixture of hydrogen and nitrogen eminently suitable for the synthesis of ammonia.

According to the process of this invention, a carbonaceous fuel is reacted with an oxidizing gas comprising air under conditions effecting substantially complete conversion of the carbon of the fuel to carbon monoxide. The reaction is conducted at a temperature above about 2,200° F. insuring complete consumption of the free oxygen. The resulting gas comprises carbon monoxide, hydrogen, nitrogen, and argon, together with small amounts of carbon dioxide and unconverted hydrocarbon, and is substantially completely devoid of free, or uncombined, oxygen. A small amount of hydrocarbon, predominantly methane, appears in the gas stream even when coke is used as the fuel; apparently methane is synthesized in the gasification reactor. Solid particles and readily condensible liquids are removed from the raw synthesis gas which is then subjected to shift conversion to convert the carbon monoxide to carbon dioxide with the simultaneous production of hydrogen; the resulting gas stream is treated for the removal of carbon dioxide and water, subjected to partial liquefaction to condense excess nitrogen, and rectified to separate the excess nitrogen and other impurities from the desired hydrogen-nitrogen mixture. The resulting product is a very pure hydrogen-nitrogen mixture, particularly suitable for the production of ammonia. The process permits exact adjustment of the composition of the hydrogen-nitrogen mixture. While a mixture of three mols hydrogen per mol of nitrogen is required for the synthesis of ammonia, mixtures of hydrogen and nitrogen in other proportions, for example, two mols hydrogen per mol of nitrogen may be produced by the process of this invention.

An object of the present invention is to provide an improved process for the preparation of a mixture of nitrogen and hydrogen.

A specific object is to provide an improved process for the preparation of ammonia synthesis feed gas.

Another object is to provide a process for producing ammonia synthesis feed gas essentially free from unreactive gases.

Still another object is to provide a process for producing ammonia synthesis feed gas by partial oxidation of carbonaceous fuels without the necessity of pure oxygen.

A further object is to provide a process for producing ammonia synthesis feed gas of exceptionally high purity.

The process of this invention will be readily understood from the following description, with reference to the accompanying drawing. The drawing is a diagrammatic flow sheet illustrating a specific example of the application process of this invention to the generation of ammonia synthesis feed gas from natural gas.

With reference to the drawing, air is compressed in compressor 4 and passed through preheater 5 into synthesis gas generator 6. Natural gas is passed through preheater 7 into the generator. The preheated air and natural gas streams are intimately mixed with one another and permitted to react with one another in a closed, compact reaction zone autogeneously maintained at a temperature above about 2,200° F. The reaction zone is free from packing and catalyst.

The partial oxidation reaction may be conducted at atmospheric pressure; preferably an elevated pressure above about 100 pounds per square inch, suitably within the range of 100 to 600 p. s. i., is maintained in the reactor. The reaction temperature is autogenously maintained in the range of 2,200 to 3,000° F., suitably 2,600° F., by preheating the reactants and by supplying an excess of oxygen over and above that amount required for conversion of all of the carbon in the fuel to carbon monoxide. The amount of oxygen supplied to the reaction zone is preferably kept at a minimum consistent with disappearance of substantially all of the hydrocarbon from the product gas. The hydrocarbon content of the product gas stream is less than 3 mol percent, preferably less than 1 mol percent. The product consists principally of nitrogen, carbon monoxide and hydrogen, is substantially completely free from uncombined oxygen, and contains small amounts of unconverted hydrocarbon, water vapor, and carbon dioxide.

The effluent stream from the generator is discharged through line 9 and is contacted with water introduced through line 10 into line 9 at the outlet of the generator, rapidly cooling the product gas stream to a temperature below about 800° F. The cooled gas stream is passed to a scrubber 11 where solids, tars, oils, and any unvaporized water is separated from the gas stream. Additional water may be introduced into scrubber 11 through line 12. The gas stream from the scrubbing tower is passed through line 13 to a shift converter 14 wherein the carbon monoxide contained in the gas is reacted with steam introduced through line 15 to produce carbon dioxide and hydrogen.

The conversion of carbon monoxide to carbon dioxide by reaction with steam to produce additional hydrogen is known as the water-gas shift reaction. This reaction is usually conducted at about 750° F. over an iron catalyst. A commercial catalyst for this reaction comprises iron oxide promoted with oxides of chromium, potassium, magnesium and aluminum. The conversion of carbon monoxide to carbon dioxide by the water-gas shift reaction is essentially complete.

The effluent from the shift converter is cooled in cooler 16 to condense unreacted steam. Cooling of the gas stream to about 100° F. is generally sufficient for condensing and removing most of the residual steam. Condensate is separated from the gas in separator 17.

After removal of condensate, the gas stream is passed to an absorber 18 where carbon dioxide is separated from the gas stream. Carbon dioxide may be removed from the product gas stream by scrubbing the gas with a suitable solvent, for example, water or an amine, e. g., monoethanolamine, or by a combination of solvents.

In this particular example, the gas is countercurrently contacted in absorber 18 with monoethanolamine (MEA) solution for the removal of carbon dioxide. The MEA solution containing absorbed carbon dioxide is drawn from the bottom of absorber 18 and passed through line 19 into stripper 20 wherein the carbon dioxide is driven off by heating. The regenerated MEA solution is returned through line 21 to the top of the absorber 18 into contact with the gas stream.

The gas stream leaving the MEA absorber through line 22 consists essentially of hydrogen and nitrogen, but still contains inert atmospheric gases (predominantly argon) and small amounts of carbon dioxide, carbon monoxide, and methane.

Residual carbon monoxide may be substantially completely removed from the gas stream by scrubbing with an aqueous solution of cuprous ammonium chloride $(Cu(NH_3)_2Cl)$ which also removes any remaining carbon dioxide. Various other salts may be used for the removal of carbon monoxide, as is known in the art. While carbon monoxide may be removed from the gas stream by absorption, if desired, it is generally not necessary in the operation of the process of this invention.

In this example, the gas stream from line 22 is passed to caustic scrubber 23 wherein it is contacted with an aqueous solution of sodium hydroxide, containing 10 percent by weight of sodium hydroxide, substantially completely removing residual carbon dioxide. The caustic solution is continuously recirculated from the bottom to the top of the scrubber by pump 24. Fresh caustic solution is added to the scrubber 23 and part of the solution discarded therefrom, as required, to maintain the required caustic solution concentration. From the caustic scrubber 23, the gas stream is passed to a water scrubber 25 wherein the gas is washed with water to remove traces of solution carried over with the gas from the caustic scrubber.

After removal of carbon dioxide, the gas stream is dehydrated. In this example, the gas is passed through line 26 to a cooler 27 where most of the water contained in the gas stream is condensed. The resulting condensate is separated from the gas in a separator or trap 28. Cooling the gas stream to a temperature on the order of 40° F. will, in general, give adequate condensation of water vapor prior to chemical dehydration. The partially dehydrated gas from separator 28 passes through a drier 29 containing a desiccant to substantially completely eliminate water vapor from the gas stream. Alumina, silica gel and sulfuric acid are suitable desiccants.

The dry gas stream resulting after dehydration is cooled by an amount sufficient to condense the excess nitrogen and higher boiling impurities including argon, carbon monoxide and methane. The partially liquified gas stream is subjected to rectification to separate a mixture of substantially pure hydrogen and nitrogen from a mixture comprising nitrogen, argon, carbon monoxide and methane. The excess nitrogen and impurities are discarded.

The dry gas stream from drier 29 is passed through line 30A through a suitable arrangement of heat exchangers 31 into a rectifying column 32. The final traces of carbon dioxide and water vapor contained in the gas stream deposit as solids on the surfaces of the heat exchanger elements. A suitable arrangement of switching valves, not illustrated, may be provided to permit deriming of the heat exchanger elements. The waste gas stream, i. e. the excess nitrogen and impurities, leaving the rectification column may be employed to vaporize the deposited solids and remove them from the heat exchanger surfaces.

The cooled gas stream is introduced through line 30B into rectifying column 32. In the rectifying column, the stream flowing upwardly through the column is contacted with a downwardly flowing stream of liquid reflux produced by liquefaction of nitrogen in the overhead product, as will be explained in more detail hereinafter. The rectifying column is provided with means for insuring intimate countercurrent contact between the liquid and gas streams within the column. Liquid nitrogen, containing dissolved hydrogen, introduced as reflux at the top of tower 32 condenses argon, carbon monoxide and methane which are concentrated at the bottom of the tower and removed, together with excess nitrogen, through line 34. Gas leaving the top of the tower is substantially completely free from the unwanted components.

The liquid stream withdrawn from the bottom of the column through line 34, comprising excess nitrogen and impurities, is passed through valve 35 into heat exchanger 36 where the liquid is vaporized, then passed through line 37A to heat exchanger system 31. After heat exchange with the incoming gas stream in heat exchanger 31, the excess nitrogen and impurities are discharged from the system through line 37B. The gases passing through the heat exchange system 31 from line 37A may be used to pick up impurities deposited on the heat exchanger elements by the incoming gas from line 30A.

Gas leaving the top of the rectifying column through line 42 is passed to a compressor 43 where its pressure is increased and then through heat exchanger 36 where it is cooled by evaporation of tower bottoms from line 34 and, finally, expanded through valve 44 into an accumulator 46. The liquified portion is essentially pure nitrogen and hydrogen, or liquid nitrogen containing dissolved hydrogen, substantially free from other constituents.

Compression and subsequent expansion of the gas stream from the top of the rectifying column is not essential to operation. Under some conditions, e. g. when the column is operated at sufficiently elevated pressure, sufficient reflux may be condensed in the heat exchanger without further compression and expansion of the overhead product from the rectifying column. It will be apparent, also, that a supplemental refrigeration cycle may be employed and that, if desired, at least a part of the liquefaction may be provided by refrigeration of the feed gas stream to the rectifying column.

The liquid condensate from accumulator 46 is returned to the top of the rectifying column 32 through line 47 as reflux. Uncondensed gases are discharged from the accumulator through line 48, passed through heat exchanger 31 and delivered as the final product gas stream through line 48B. Gas relatively richer in nitrogen than the gas from accumulator 46 may be by-passed through line 49, as required, from the top of column 32 into line 48A to accurately adjust the composition of the purified gas stream.

The synthesis of ammonia (not illustrated) is effected by reacting nitrogen with hydrogen in the presence of a suitable catalyst. In the usual commercial processes, the ammonia synthesis reaction is conducted at a pressure of several thousand pounds per square inch, suitably 5,000 and higher, and at an elevated temperature suitably around 950° F. One of the commercial catalysts is prepared by admixing oxides of potassium and aluminum as promoters with magnetic iron oxide which is subsequently reduced to metallic iron. In commercial operations, low conversion per pass is obtained, i. e. only a limited amount of the nitrogen-hydrogen mixture is converted to ammonia each time it passes over the catalyst. Commonly, from 8 to 12 percent of the feed mixture is converted per pass over the catalyst. Unconverted nitrogen and hydrogen are recycled. Roughly 90 percent of the feed to the converter represents recycled gas.

Undesirable gases, notably hydrocarbons and inert atmospheric gases, tend to accumulate in the conversion section of the ammonia synthesis gas. To prevent the buildup in concentration of undesirable gases in the converter, it is customary to purge a portion of the recycled gas stream. As a result of this purge, generally only about 85 percent of the hydrogen, which has been made and purified at considerable expense, is ultimately converted to ammonia. The present process, by substantially completely eliminating inert gas from the feed stream to the ammonia synthesis reactor prevents most of this wasteful loss of hydrogen.

While the foregoing detail description has been directed specifically to the generation of ammonia synthesis feed gas from natural gas, it is to be understood that other carbonaceous fuels may be employed as the source of the raw synthesis gas as will be evident from the following examples.

EXAMPLE 1

Natural gas of the following composition is preheated to 1,100° F. and charged to a synthesis gas generator where it is mixed with air preheated to 1,100° F.

*Natural gas composition*

| Component: | Mol percent |
|---|---|
| Methane | 82.3 |
| Ethane | 6.6 |
| Propane | 5.4 |
| Butane | 1.5 |
| Pentane | 0.5 |
| Carbon dioxide | 0.9 |
| Nitrogen | 2.6 |
| Oxygen | 0.2 |

This natural gas is fed at the rate of 48,100 standard cubic feet per hour while air is fed at the rate of 213,000 standard cubic feet per hour. The generator is operated at 350 p. s. i. g. with an autogenously maintained temperature of 2,600° F.

The product gas from the generator has the following approximate composition on a dry basis.

*Raw synthesis gas composition*

| Component: | Mol percent |
|---|---|
| Carbon monoxide | 15.9 |
| Hydrogen | 23.2 |
| Nitrogen | 57.7 |
| Argon | 0.7 |
| Carbon dioxide | 2.3 |
| Methane | 0.2 |

The raw synthesis gas (289,500 S. C. F. H.) is cooled to 450° F. by direct contact with water in a quenching and scrubbing operation which effects removal of solids and readily condensible liquids from the gas stream. The gas stream is reheated to 700° F., mixed with steam at 750° F., and passed over an iron shift conversion catalyst. The product gas from the shift converter contains approximately 2 percent by volume residual carbon monoxide on a dry, carbon dioxide-free basis. The effluent from the shift converter at 320 p. s. i. g. is cooled to 110° F., condensate is separated therefrom, and the gas is passed through an absorber where it is contacted with monoethanolamine solution entering the absorber at 110° F. Effluent from the MEA absorber is subjected to a caustic wash and a water wash, then cooled to about 40° F. under a pressure of about 295 p. s. i. g. Condensate is separated from the gas stream and the partially dried gas passed through a drier containing alumina which reduces the water vapor content of the gas to less than 2 p. p. m. (parts per million by volume). To dry gas stream is cooled to —315° F. in reversing heat exchangers and passed into a rectifying column operating at 275 p. s. i. g. Excess nitrogen, together with the argon, methane, and carbon monoxide, is withdrawn from the bottom of the column as liquid, and vaporized at substantially atmospheric pressure in heat exchange with nitrogen and hydrogen in the top of the column providing reflux to the column. The cold gas streams leaving the rectifying column pass through the heat exchangers, cooling the incoming gas stream. The product gas stream contains three mols of hydrogen per mol of nitrogen, less than about 0.3 mol percent methane, less than 10 p. p. m. argon (by volume) and less than one p. p. m. carbon monoxide.

EXAMPLE 2

A Kansas cycle gas oil from refinery operations having an API gravity of 4.5 and a Saybolt Furol viscosity of 259 at 122° F. is used as fuel. This oil has the following approximate analysis:

*Ultimate analysis of oil*

| Component: | Weight percent |
|---|---|
| Carbon | 89.0 |
| Hydrogen | 9.0 |
| Nitrogen | 1.0 |
| Sulfur | 1.0 |

The oil is preheated, atomized with steam, and reacted with air in a flow-type gas generator at 2,630° F. and 350 p. s. i. g. The oil and steam mixture enters the generator at 550° F., the air, at 150° F. The raw synthesis gas has the following approximate analysis on a dry basis:

*Raw synthesis gas analysis*

| Component: | Mol percent |
|---|---|
| Hydrogen | 16.0 |
| Carbon monoxide | 18.0 |
| Carbon dioxide | 6.6 |
| Nitrogen and argon | 59.1 |
| Methane | 0.2 |
| Hydrogen sulfide | 0.1 |

The feed to the generator consists of 64,605 S. C. F. H. of air, 807 pounds per hour of oil, and 244 pounds per hour of steam. This yields 86,276 S. C. F. H. of dry raw synthesis gas of the foregoing composition.

The raw gas is treated as in Example 1 to yield a 3.1 hydrogen-nitrogen mixture for ammonia synthesis.

The hydrogen sulfide is removed with carbon dioxide in the carbon dioxide removal steps described above in the detailed description.

EXAMPLE 3

Utah butiminous coal is gasified with steam and air in a flow-type gas generator operated at 2,650° F. and 210 p. s. i. g. The coal has the following approximate ultimate analysis:

*Ultimate analysis of coal*

| Component | Weight percent |
|---|---|
| Carbon | 74.1 |
| Hydrogen | 5.4 |
| Oxygen | 10.4 |
| Nitrogen | 1.3 |
| Sulfur | 0.6 |
| Ash | 8.2 |

The coal is suspended in steam and the mixture supplied to the generator at a temperature of 450° F. The air is supplied at 150° F. The generator is fed at the rate of 771 pounds of coal, 251 pounds of steam and 44,530 S. C. F. of air per hour. The generator produces 57,290 S. C. F. H. of dry raw synthesis gas of the following approximate analysis on a dry basis:

*Raw synthesis gas composition*

| Component | Mol percent |
|---|---|
| Hydrogen | 11.6 |
| Carbon monoxide | 16.5 |
| Carbon dioxide | 9.6 |
| Nitrogen | 61.7 |
| Methane | 0.5 |
| Hydrogen sulfide | 0.1 |

The raw synthesis gas is processed as described above in the detailed description of the process to produce a hydrogen-nitrogen mixture for ammonia synthesis.

From the foregoing specific examples illustrating the operation of the present invention, it will be evident that the process of this invention is adaptable to the production of nitrogen-hydrogen mixtures from various carbonaceous fuels.

Obviously, many modifications and variations of the invention, as hereinbefore set forth, may be made without departing from the spirit and scope thereof, and only such limitations should be imposed as are indicated in the appended claims.

I claim:

1. A process for the production of a mixture of hydrogen and nitrogen containing three volumes of hydrogen per volume of nitrogen, which comprises, in combination, generating a raw synthesis gas mixture of carbon monoxide, hydrogen and nitrogen containing more than one volume of nitrogen for each three volumes of carbon monoxide and hydrogen by reacting a carbonaceous fuel with an oxygen-containing gas comprising air as the sole source of free oxygen at a temperature in the range of 2200° to 3000° F. and a pressure above about 100 p. s. i. g.; reacting carbon monoxide contained in said gas mixture with steam under conditions effecting substantially complete conversion of carbon monoxide to carbon dioxide with concomitant production of hydrogen; separating carbon dioxide and water vapor from the resulting gas mixture; contacting the resulting partially purified gas consisting essentially of hydrogen and nitrogen with liquid nitrogen in countercurrent flow at elevated pressure in a contacting zone; withdrawing a gas stream containing nitrogen and hydrogen substantially free from other gases from said contacting zone; subjecting at least a portion of said stream to cooling at elevated pressure sufficient to condense at least part of the nitrogen therefrom; separating condensed nitrogen containing dissolved hydrogen from uncondensed gas comprising hydrogen; returning said condensed nitrogen to said contacting zone as said liquid nitrogen and thus effecting condensation of gases other than hydrogen and nitrogen from the gas stream; and withdrawing from said contacting zone nitrogen in liquid phase in excess of that equal to one third of the hydrogen thus purified together with said other gases trapped in said liquid nitrogen, and thereby producing a mixture of nitrogen and hydrogen substantially free from other gases in relative proportions of one volume of nitrogen to three volumes of hydrogen.

2. A process as defined in claim 1 wherein said nitrogen and hydrogen substantially free from other gases withdrawn from said contacting zone and subjected to cooling are compressed prior to said cooling to a pressure in excess of the pressure in said contacting zone.

3. A process as defined in claim 1 wherein said oxygen-containing gas is a mixture of air and steam.

4. A process as defined in claim 1 wherein said oxygen-containing gas is a mixture of air and carbon dioxide.

5. A process as defined in claim 1 wherein said carbonaceous fuel is a solid fuel.

6. A process as defined in claim 1 wherein said carbonaceous fuel is liquid hydrocarbon.

7. A process as defined in claim 1 wherein said carbonaceous fuel is gaseous hydrocarbon.

References Cited in the file of this patent

UNITED STATES PATENTS

| | | |
|---|---|---|
| 1,296,992 | Maxted | Mar. 11, 1919 |
| 1,716,813 | Casale | June 11, 1929 |
| 1,935,469 | Ellis | Nov. 14, 1933 |
| 1,957,744 | Wietzel et al. | May 8, 1934 |
| 2,582,938 | Eastman et al. | Jan. 15, 1952 |

FOREIGN PATENTS

| | | |
|---|---|---|
| 307,529 | Great Britain | Mar. 4, 1929 |